United States Patent
Resnik et al.

(10) Patent No.: US 10,824,512 B2
(45) Date of Patent: Nov. 3, 2020

(54) MANAGING JOURNALING RESOURCES WITH COPIES STORED IN MULTIPLE LOCATIONS

(71) Applicant: EMC IP Holding Company LLC, Hopkinton, MA (US)

(72) Inventors: Inna Resnik, Tel Aviv (IL); Zvi Schneider, Hod Hasharon (IL); Dani Shemesh, Ramat-gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 16/051,194

(22) Filed: Jul. 31, 2018

(65) Prior Publication Data
US 2020/0042394 A1 Feb. 6, 2020

(51) Int. Cl.
*G06F 11/14* (2006.01)
*G06F 11/16* (2006.01)
(Continued)

(52) U.S. Cl.
CPC ...... *G06F 11/1451* (2013.01); *G06F 11/0727* (2013.01); *G06F 11/1662* (2013.01); *G06F 11/181* (2013.01); *G06F 16/1815* (2019.01); *G06F 16/1873* (2019.01); *G06F 16/2329* (2019.01)

(58) Field of Classification Search
None
See application file for complete search history.

(56) References Cited

U.S. PATENT DOCUMENTS 7,444,464 B2  10/2008  Urmston et al.
8,095,726 B1  1/2012  O'Connell et al.
(Continued)

FOREIGN PATENT DOCUMENTS

WO  2016111954 A1  7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Charles Rones
*Assistant Examiner* — Jonah C Krieger
(74) *Attorney, Agent, or Firm* — Ryan, Mason & Lewis, LLP

(57) ABSTRACT

A storage system in one embodiment comprises a storage controller and a plurality of storage devices comprising a plurality of memory portions. The storage controller is configured to monitor a plurality of servers for a failure event. The servers store a plurality of copies of the memory portions. The storage controller is further configured to mark as invalid a copy of a memory portion on a failed server, search for and identify a location on an operational server for storing a new version of the copy, and communicate the copy invalidity and the identified location to a client device using the memory portion. The client device is configured to generate the new version of the copy for storage on the operational server, and the storage controller receives a notification from the client device regarding whether the new version of the copy was generated and stored on the operational server.

20 Claims, 11 Drawing Sheets

(51) Int. Cl.
  *G06F 11/18* (2006.01)
  *G06F 11/07* (2006.01)
  *G06F 16/18* (2019.01)
  *G06F 16/23* (2019.01)

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,606,870 | B1 | 3/2017 | Meiri et al. |
| 9,716,754 | B2 | 7/2017 | Swift |
| 2004/0064669 | A1* | 4/2004 | Browning ........... G06F 12/1081 711/202 |
| 2004/0243650 | A1* | 12/2004 | McCrory ............. G06F 9/5061 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0111160 | A1* | 5/2013 | Benhase ............... G06F 3/0683 711/160 |
| 2013/0325824 | A1 | 12/2013 | Shoens |
| 2014/0181016 | A1 | 6/2014 | Whitehead et al. |
| 2016/0110263 | A1* | 4/2016 | Tracht ................. G06F 11/1435 714/6.23 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0147649 | A1* | 5/2017 | Aronovich ........ G06F 16/24556 |
| 2017/0192857 | A1 | 7/2017 | Meiri et al. |
| 2018/0089239 | A1* | 3/2018 | Gattegno ............. G06F 16/221 |
| 2018/0329818 | A1* | 11/2018 | Cheng ................ G06F 11/1471 |
| 2019/0068577 | A1* | 2/2019 | Kunjaraman Pillai ...................... H04L 67/303 |
| 2019/0073140 | A1* | 3/2019 | Yamada ................ G06F 3/0616 |
| 2019/0238653 | A1* | 8/2019 | Syomichev ......... G06F 16/1734 |
| 2019/0340273 | A1* | 11/2019 | Raman ................. G06F 9/5077 |
| 2020/0020398 | A1* | 1/2020 | Miller .................. G06F 3/0653 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

D. Schwalb et al., "nvm_malloc: Memory Allocation for NVRAM," International Workshop on Accelerating Data Management Systems Using Modern Processor and Storage Architectures—ADMS, Session II: System Acceleration, Aug. 31, 2015, pp. 61-72.

Wikipedia, "Dell EMC XtremeIO," https://en.wikipedia.org/wiki/Dell_EMC_XtremeIO, Feb. 27, 2018, 3 pages.

Wikipedia, "Journaling File System," https://en.wikipedia.org/wiki/Journaling_file_system, Apr. 18, 2018, 4 pages.

Wikipedia, "Non-Volatile Random-Access Memory," https://en.wikipedia.org/wiki/Non-volatile_random-access_memory, Jul. 6, 2018, 5 pages.

* cited by examiner

| Parameter | Value |
| --- | --- |
| Chunk ID | 1973 |
| Generation ID | 2 |
| Re-location in progress | False |
| Number of failed communication attempts | 0 |

| Chunk copies | Server ID | Offset in memory | Is valid |
| --- | --- | --- | --- |
| Current #1 | A | 5874 | True |
| Current #2 | B | 3021 | True |
| Desired #1 | - | | |
| Desired #2 | - | | |

| Parameter | Value | |
|---|---|---|
| Chunk ID | 1973 | |
| Generation ID | 2 | |
| Re-location in progress | False | |
| Number of failed communication attempts | 0 | |
| Chunk copies | Server ID | Offset in memory | Is valid |
| Current #1 | A | 5874 | False |
| Current #2 | B | 3021 | True |
| Desired #1 | C | 421 | True |
| Desired #2 | B | 3021 | True |

| Parameter | | Value | |
|---|---|---|---|
| Chunk ID | | 1973 | |
| Generation ID | | 2 | |
| Re-location in progress | | True | |
| Number of failed communication attempts | | 0 | |
| Chunk copies | Server ID | Offset in memory | Is valid |
| Current #1 | A | 5874 | False |
| Current #2 | B | 3021 | True |
| Desired #1 | C | 421 | True |
| Desired #2 | B | 3021 | True |

| Parameter | Value |
|---|---|
| Chunk ID | 1973 |
| Generation ID | 2 |
| Re-location in progress | True |
| Number of failed communication attempts | 1 |

| Chunk copies | Server ID | Offset in memory | Is valid |
|---|---|---|---|
| Current #1 | A | 5874 | False |
| Current #2 | B | 3021 | True |
| Desired #1 | C | 421 | True |
| Desired #2 | B | 3021 | True |

| Parameter | | Value | |
|---|---|---|---|
| Chunk ID | | 1973 | |
| Generation ID | | 4 | |
| Re-location in progress | | False | |
| Number of failed communication attempts | | 0 | |
| Chunk copies | Server ID | Offset in memory | Is valid |
| Current #1 | C | 421 | True |
| Current #2 | B | 3021 | True |
| Desired #1 | - | | |
| Desired #2 | - | | |

MANAGING JOURNALING RESOURCES WITH COPIES STORED IN MULTIPLE LOCATIONS

FIELD

The field relates generally to information processing systems, and more particularly to storage in information processing systems.

BACKGROUND

A journal of a file system is a data structure that tracks or logs changes to or other activity in a file system. In the event of a system crash, or corruption of the file system due to, for example improper shutdown or startup procedures, hardware failures, and/or Network File System (NFS) write errors, the file system can be restored and/or inconsistencies repaired by reference to the journal. For example, a journal can be reviewed to find uncommitted transactions and a file system can be rolled back in time to changes made prior to these transactions. File system journals may keep track of one or more of stored metadata, stored data and related metadata.

Modern storage systems like scale-out all-flash storage arrays, often use non-volatile random-access memory (NVRAM) or other protected memory resources for journaling input/output (IO) request related metadata. In the case of a distributed scale-out architecture, the memory resources are each divided into usage units, also referred to herein as "memory chunks," and are accessible from several system components (e.g., servers). The memory resources on one server are protected from server failure by maintaining a backup copy, for example, on another server.

In distributed scale-out architectures, a number of challenges exist in maintaining redundancy and high availability (HA) in the event of failure of one or more system components. For example, failure of components on both user and memory resource management sides may occur. In order to avoid data corruption, improved techniques for the storage, maintenance, distribution and validation of up-to-date memory chunks of journaling data are needed.

SUMMARY

Illustrative embodiments include techniques for the exchange of information and decision making between user/client and storage management sides concerning maintenance, storage and relocation of memory chunk copies in the event of system and/or component failures. As a result, these embodiments are better able to ensure validity of memory chunk copies and storage locations, provide for the utilization of the most up-to-date versions of the memory chunk copies, and allow for increased communication and data retention on both management and user sides of a storage system.

In one embodiment, an apparatus comprises a storage system that includes a storage controller and a plurality of storage devices comprising a plurality of memory portions. The storage controller is configured to monitor a plurality of servers for a failure event, wherein the servers store a plurality of copies of the memory portions. The storage controller is further configured to mark as invalid at least one copy of a memory portion on a failed server, search for and identify at least one location on an operational server for storing a new version of the at least one copy, and communicate the invalidity of the at least one copy and the identified at least one location to a client device using the memory portion. The client device is configured to generate the new version of the at least one copy for storage on the operational server, and the storage controller receives a notification from the client device regarding whether the new version of the at least one copy was generated and stored on the operational server.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 4 is a chart illustrating information stored in a storage controller repository and corresponding to a memory portion prior to failure of a server in an illustrative embodiment.

FIG. 5 is a chart illustrating information stored in a storage controller repository and corresponding to a memory portion following an update to copy validity after failure of the server in an illustrative embodiment.

FIG. 6 is a chart illustrating information communicated to a host device and corresponding to attempts to relocate a copy of a memory portion following failure of the server in an illustrative embodiment.

FIG. 7 is a chart illustrating information about a memory portion and corresponding to a failed communication attempt between a host device and a storage controller following failure of the server in an illustrative embodiment.

FIG. 8 is a chart illustrating information stored in a storage controller repository and corresponding to a memory portion following relocation of the memory portion copy in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
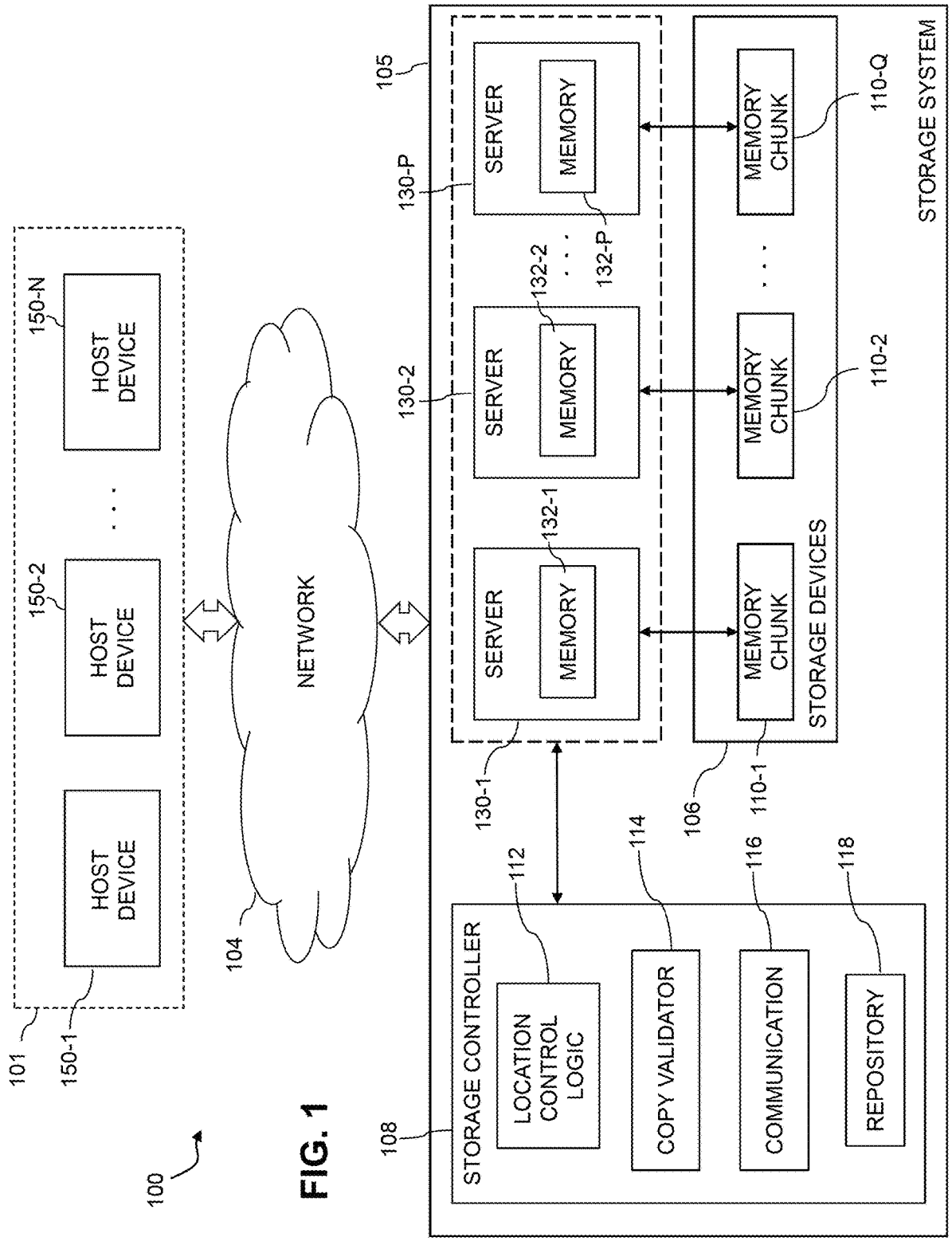
FIG. 1 is a block diagram of an information processing system comprising a storage system configured to maintain storage of memory portion copies in multiple locations and enable communication about storage status between storage controller and user/client components in an illustrative embodiment.

FIG. 1 shows an information processing system 100 configured in accordance with an illustrative embodiment. The information processing system 100 comprises a computer system 101 that includes host devices 150-1, 150-2, . . . 150-N. The variable N and other index variables K, L, P and Q used herein are assumed to be arbitrary positive integers greater than or equal to two. The host devices 150 communicate over a network 104 with a storage system 105. The computer system 101 is assumed to comprise an enterprise computer system, cloud-based computer system or other arrangement of multiple compute nodes associated with respective users or clients. The host devices 150 of the computer system 101 in some embodiments illustratively provide compute services such as execution of one or more applications on behalf of each of one or more users or clients associated with respective ones of the host devices 150.

The host devices 150 and storage system 105 illustratively comprise respective processing devices of one or more processing platforms. For example, the host devices 150 and the storage system 105 can each comprise one or more processing devices each having a processor and a memory, possibly implementing virtual machines and/or containers, although numerous other configurations are possible.

The host devices 150 and the storage system 105 can additionally or alternatively be part of cloud infrastructure such as an Amazon Web Services (AWS) system. Other examples of cloud-based systems that can be used to provide one or more of host devices 150 and storage system 105 include Google Cloud Platform (GCP) and Microsoft Azure.

The host devices 150 and the storage system 105 may be implemented on a common processing platform, or on separate processing platforms.

The host devices 150 are configured to write data to and read data from the storage system 105 in accordance with applications executing on those host devices 150 for system users, including, but not necessarily limited to, clients utilizing the storage system 105.

The term "user" or "client" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 150 over the network 104. The storage system 105 comprises a plurality of storage devices 106 and an associated storage controller 108. The storage devices 106 are configured to store data in a plurality of memory resource portions 110-1, 110-2, . . . 110-Q (referred to herein as "memory chunks") under the control of the storage controller 108. The memory chunks 110 include one or more usage units of a memory resource (e.g., non-volatile memory (NVM) device) storing, for example, journaling data, such as, but not necessarily limited to, IO request related metadata. The memory chunks 110 each comprise at least a part of a physical storage space of the storage devices 106. The storage devices 106 can store other types of datasets, including additional or alternative journaling data or other arrangements of data.

The storage devices 106 illustratively comprise solid state drives (SSDs). Such SSDs are implemented using NVM devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO® storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes location control logic 112, a copy validator 114, a communication component 116 and a repository 118.

The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its copy validator 114 is configured to monitor a plurality of servers 130-1, 130-2, . . . 130-P for a failure event. A failure event can include, but is not necessarily limited to, server failure due to for example, a system crash, corruption of a file system, hardware failures, and/or write errors. A failure event results in a server being non-operational, inaccessible and/or unusable. The servers 130 comprise respective memories 132-1, 132-2, . . . , 132-P, in which a plurality of copies of the memory chunks 110 are stored. For example, each server 130 may store a copy of each of one or more memory chunks 110 in its corresponding memory 132. Each server memory 132 may be, for example, volatile memory, such as, for example, dynamic random access memory (DRAM). In accordance with an embodiment of the present invention, all copies of same memory chunk are identical as long as all servers on which the copies are stored are accessible.

The storage controller 108 via its copy validator 114 is further configured to identify one or more failed servers due to one or more failure events, and mark as invalid all memory chunk copies on the failed servers 130.

In connection with an invalid memory chunk copy from a failed server, the storage controller 108 via its location control logic 112 is configured to search for and identify at least one memory location on an operational and accessible server 130, where a new version of the invalid memory chunk copy can be stored. The memory location can be identified by, for example, an address and/or an offset in a memory of the operational and accessible server 130.

The storage controller 108 via its communication component 116 is configured to communicate the invalidity of the memory chunk copy and the identified memory location on the operational server 130 to a host device 150. In accordance with an embodiment of the present invention, the host device 150 receiving the communication corresponds to a client user of the storage system 105, and the host device 150 uses the memory chunk 110 which corresponds to the invalidated memory chunk copy. The communication between the storage controller 108 and the host device 150 can be performed, for example, over the network 104 using IP or other communication protocols.

The storage controller 108 comprises a data repository 118 storing information associated with the memory chunks 110. For example, referring to the charts in FIGS. 4-8, in connection with a memory chunk 110, the repository 118 stores an identification entry (e.g., a numerical designator) for the memory chunk (Chunk Identification (ID)), and a value indicating a number of times copies of the memory chunk have been generated (Generation ID). The Generation ID represents a last known Generation ID as it was reported by a host device 150 to the storage controller 108. In accordance with an embodiment of the present invention, the memory chunks 110 also store the Chunk and Generation IDs in the memory chunks 110.

The repository 118 further stores an entry indicating whether a relocation attempt is in progress for the memory chunk (Relocation in Progress) by a "True" designation indicating that a relocation is in progress, or a "False" designation indicating that a relocation attempt is not in progress. For example, the storage controller 108 deems a relocation to be in progress if the storage controller 108 via its location control logic 112 is searching for and/or identifying a memory location on an operational and accessible server 130, where a new version of an invalid memory chunk copy can be stored. Referring to the chart 600 in FIG. 6, when the relocation attempt is in progress (as indicated by the "True" designation), the repository 118 includes a plurality of desired locations (Desired #1 and Desired #2) for copies of the memory chunk. The repository 118 further includes current locations (Current #1 and Current #2) of copies of the memory chunk. The current and desired locations include a corresponding server ID identifying the server on which the memory chunk is or may be stored, and a corresponding memory location (e.g., offset in memory) identifying where in the server's memory the memory chunk is or may be stored.

Figure 3:
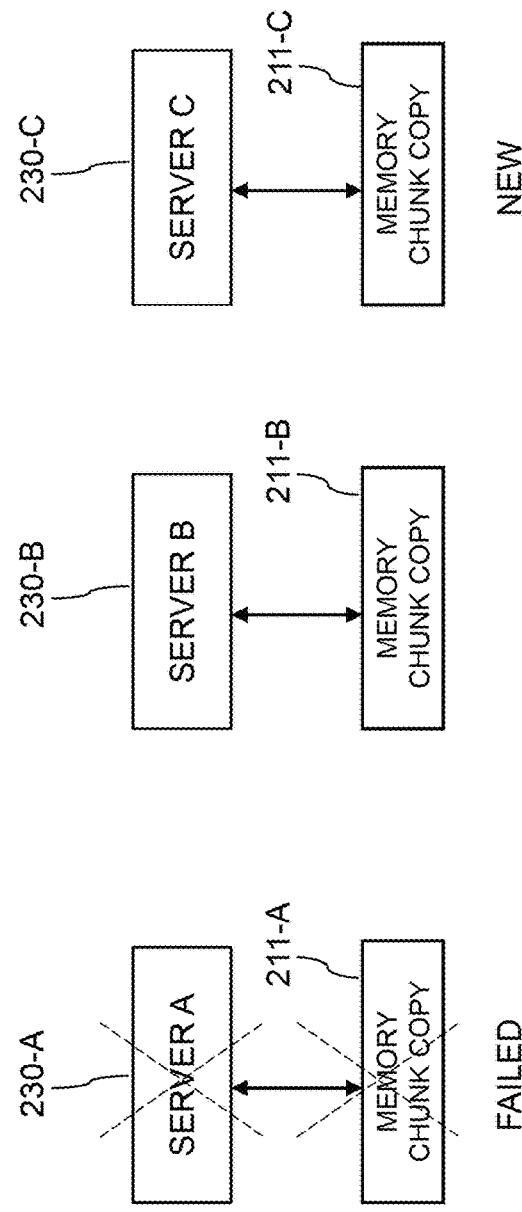
FIG. 3 is a block diagram illustrating relocation of a copy of a memory portion in the event of a server failure in an illustrative embodiment.

The current and desired locations also include an indication whether the location is valid. For example, in FIGS. 5, 6 and 7, in the event of failure of server A, the validity of current location #1 corresponding to server A is designated as "False" because server A has failed. The remaining current and desired locations are designated as "True" indicating that servers B and C are operational and deemed valid. As can be seen in FIGS. 5, 6, and 7, the Desired #2 location in this case is the same as the Current #2 location since server B remains available. FIG. 3 illustrates a situation where Server A 230-A fails, and the memory chunk copy 211-A on Server A is replaced by a newly generated memory chunk copy 211-C on Server C 230-C. In this case, Server C corresponding to memory chunk copy 211-C was the Desired #1 copy and becomes the Current #1 copy. Memory chunk copy 211-B on Server B 230-B remains the Current #2 copy of the memory chunk. Similar to what is shown in FIGS. 6 and 7, during the relocation process, memory chunk copy 211-B on Server B 230-B is designated as both the Current #2 and Desired #2 copies.

The repository 118 further includes information indicating a number (if any) of sequential failed attempts by the storage controller 108 to communicate with a host device 150. For example, the chart 700 in FIG. 7 indicates one failed communication attempt, which can be due to, for example, a storage controller 108 being subject to a failure event and failing prior to receiving a communication response from a host device 150. The failure event may result in the storage controller 108 being non-operational, inaccessible and/or unusable. Upon restart, the storage controller 108 will attempt the communication again, and indicates a failed communication attempt in the repository 118.

Although not shown in FIGS. 4-8, the repository 118 further includes data regarding the identity of a user or client that is using a particular memory chunk 110 associated with a Chunk ID.

The storage controller 108 is configured to update the repository 118 regarding invalidity of one or more memory chunk copies and the progress of a search for and the identification of one or more locations on one or more accessible servers 130 for storing new versions of the one or more memory chunk copies. For example, upon a server's failure, the storage controller 108 marks all chunk copies located on the problematic server as invalid, and finds new locations for the lost copies. In this case, the repository 118 is updated to include invalidity designations of lost copies in the current locations, and to include desired locations based on the identification of new locations on available servers 130. For example, the chart 400 in FIG. 4 indicates repository information prior to a failure event, with valid memory chunk copies on servers A and B, and indicating no relocation in progress. Referring to the chart 500 in FIG. 5, upon failure of server A, the storage controller 108 via the copy validator 114 updates the validity of the chunk copy on server A, and indicates Desired #1 and #2 locations for the memory chunk copies. The Desired #1 location includes a new location on a new server, and, as noted above, the Desired #2 location is the same as the Current #2 location since server B remains available.

Referring to FIG. 6, the storage controller 108 updates a "Relocation in progress" indication in its repository 118, and then initiates communication with one or more host devices 150 using the memory chunks 110 associated with the problematic servers. In order to minimize the total number of messages between the storage controller 108 and host devices 150, a single communication message may contain information regarding a group of memory chunks 110 and their corresponding lost copies.

As shown in FIG. 6, for every memory chunk 110, the information sent by the storage controller 108 to a host device 150 includes Chunk ID, a last known Generation ID associated with the memory chunk, an indication of whether a relocation is in progress, a number of failed communication attempts with the host device(s), and memory chunk copy information. The last known Generation ID is the number of times copies of the memory chunk have been generated as it was reported to the storage controller 108 by a host device 150 associated with the use of the memory chunk 110.

The copy information includes, for each copy, location details (e.g., server address and/or offset in memory), and an indication of copy validity (e.g., "False" if the copy is associated with a problematic server, "True" if the copy is associated with an otherwise available server). Alternatively, only information for copies having a "True" validity designation are sent to the host device(s) 150. The copy information further includes current and desired locations for copies of a memory chunk 110. According to an embodiment, the number of desired locations proposed to a host device 150 can be limited to a predetermined number. For example, in a non-limiting illustration, up to 2 desired locations for copies of the memory chunk can be proposed to the host device 150.

If the storage controller 108 fails and restarts while awaiting a response from the host device(s) 150, if a host device(s) 150 fails while handling a communication from the storage controller 108, and/or if one or more of the involved servers become inaccessible while a communication or response to a communication is being processed, the storage controller 108 will retry the communication to the host device(s) 150 and increase the number of failed communication attempts indicated in the repository 118 and in the communication. By keeping track of the number of failed communication attempts, the communication can be repeated or retried without unintended effects.

For example, referring to FIG. 7, the difference from FIG. 6 is an increase of the number of failed communication attempts to 1. In this case, for example, before it receives a response from the host device(s) 150, the storage controller 108 fails and is restarted. Upon restart, the storage controller 108 reattempts the communication to the host device(s) with an indication of one failed communication attempt.

Figure 2:
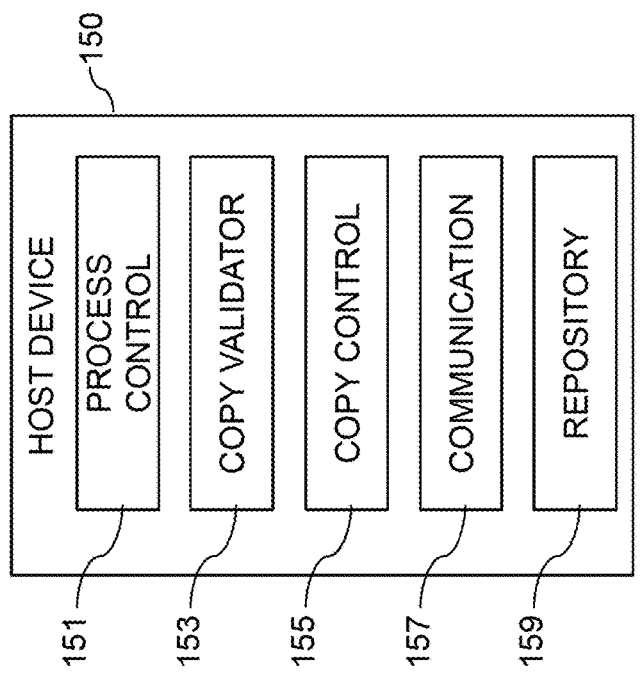
FIG. 2 is a block diagram of a host device in an illustrative embodiment.

Referring to FIG. 2, each host device 150 includes a process control component 151, a copy validator 153, a copy control component 155, a communication component 157 and a repository 159. The communication from the storage controller 108 to the host device(s) 150 may include a request to the host device(s) 150 to suspend all processes which will modify data stored in the memory chunk corresponding to the problematic copies. In response to this request, a host device 150 via the process control component 151, suspends all processes that may or will modify the information stored in the memory chunk.

In response to the communication from the storage controller 108, the host device 150, via the copy validator 153, analyzes the locations identified by the storage controller 108 as valid and eliminates and marks as invalid memory chunk copies or proposed locations for memory chunk copies which are on inaccessible, inoperable and/or unusable servers. For example, during the time between identification by the storage controller of a valid copy location option and communication processing by the host device 150, the server associated with the identified valid copy location option may have failed.

The host device 150, via the copy validator 153, is also configured to eliminate memory chunk copies or proposed locations for memory chunk copies associated with an incorrect Generation ID for that copy. For example, the host device 150, via the copy validator 153, is configured to determine that the Generation ID is incorrect with respect a particular copy on a given server when the Generation ID in the memory chunk 110 is less than a last known Generation ID received from the storage controller 108 and/or the Generation ID in the memory chunk 110 is greater than a sum of the last known Generation ID received from the storage controller 108 and a number of failed communication attempts between the storage controller 108 and the host device 150. For example, assuming GID=Generation ID in the memory chunk 110, MID=the last known generation ID from the storage controller 108, and Attempts=the number of previous failed attempts communicated between the storage controller 108 and the host device 150, a memory chunk copy is considered valid if the following rule (1) applies:

$$MID \leq GID \leq MID + \text{Attempts} \qquad (1)$$

For example, referring back to FIG. 6, host device 150 will find the copy on server B valid if the copy corresponds to the correct Chunk ID and GID=2, which is equal to MID and MID+Attempts. In connection with the copy on server C, prior to communication between the storage controller 108 and the host device 150 of the decision by the storage controller 108 to use the free offset in the memory of server C as described in connection with FIGS. 5 and 6, the host device will not find a valid copy on server C. Following communication between the storage controller 108 and the host device 150 of the decision to use the free offset in the memory of server C, in response to the generation of a new copy of the memory chunk on server C (discussed further herein below), the host device 150 will increase the GID to 3, and also update the Generation ID associated with copies on servers C and B and in its repository 159 to 3.

Alternatively, referring back to FIG. 7, in the event of a failed communication attempt, host device 150 will find the copies on servers B and C valid if the copies correspond to the correct Chunk ID and GID=2, which is equal to MID and less than MID+Attempts, or GID=3, which is greater than MID and equal to MID+Attempts. In this case, in response to the generation of a new copy of the memory chunk on server C (discussed further herein below), the host device 150 will increase the GID to 4, and also update the generation ID associated with copies on servers C and B and in its repository 159 to 4. The memory chunks and the copies on the servers respectively include metadata associated therewith indicating the GID and Generation ID, respectively.

In general, amongst all suitable (e.g., valid) memory chunk copies, the host device can be configured to select the memory chunk copy associated with the highest GID, and within the limits of rule (1). In the event that a host device 150 does not find any valid copy candidates (e.g., none of the proposed servers are accessible and/or the GIDs are not correct), the host device returns a failure message to the storage controller 108. If the host device 150 determines at least one valid memory chunk copy that can be created on an available server 130 in response to a failure event, the host device 150, via the copy control component 155, is configured to generate the new version of the memory chunk copy for storage on the accessible server as per the desired locations received from the storage controller 108.

In keeping with the working example, referring to FIGS. 3 and 8, the host device 150, via the copy control component 155, generates a new memory chunk copy 211-C on server C 230-C, and increases the GID and Generation ID to 4. As a result, the memory chunk copy 211-C on server C 230-C becomes the Current #1 copy and the memory chunk copy 211-B on server B 230-B is the Current #2 copy. The host device 150, via a communication component 157, transmits a notification to the storage controller 108 such as, for example, a status report including the information in the chart 800 in FIG. 8 indicating that the new memory chunk copy 211-C was generated and stored on the server C 230-C at a particular offset in the server's memory, and is a valid copy. The notification includes the Chunk ID, and the updated Generation ID value of 4. The notification also indicates that the relocation is no longer in progress, removes indications corresponding to desired copy locations (Desired #1 and Desired #2), and lists the current locations (Current #1 and Current #2) of the memory chunk copies and their validity designations. The host device 150 and the storage controller 108 update their respective repositories 118 and 159 with the notification information. Like the communication component 116 of the storage controller 108, the communication component 157 of the host device 150 executes communication with the storage controller 108 or other components over the network 104 using IP or other communication protocols. The generation of the new memory chunk copy by the host device 150 synchronizes the new copy with the latest valid copy. If the generation of the new memory chunk copy is unsuccessful, the host device 150 returns a failure message to the storage controller 108.

The present embodiment and other embodiments described herein implement logic and storage information regarding memory chunks and memory chunk copies on both user (e.g., host or client) and storage system control/management sides, which allows for the creation of a robust, accurate and safe memory chunk relocation protocol when faced with failure of one or more system components. Traditional approaches implement most of the logic involved in memory chunks relocation on a memory resource management side, and rely on asymmetric communication, where storage system management components alone make all of the decisions regarding memory chunk relocation in the event of system component failures. Indeed, in conventional approaches, users/clients only report success or failure of memory chunk storage and relocation.

Advantageously, embodiments of the present invention provide techniques for the balanced exchange of information and decision making between user/client and storage management sides concerning storage options and storage events for memory chunk copies. For example, each of user/client and storage management sides maintain repositories of memory chunk information related to the number of generated memory chunk copies, whether copy relocation is in progress, failed communication attempts between each side, and status of memory chunk copies. In accordance with embodiments of the present invention, the repository and status information is exchanged between user/client and storage management sides in all phases of a relocation process. In addition, the embodiments of the present invention require both storage management and user/client components to explore the validity of memory chunk copies and proposed memory locations, and exchange information regarding conclusions made about validity. Unlike prior systems, memory chunk copies are generated by the user/client side in response to directives made about prospective memory locations made on the storage management side.

As a result, in response to system failures, these embodiments are better able to ensure validity of memory chunk copies, including whether the most up-to-date versions of the memory chunk copies are being utilized. Further, by allowing for increased communication and data retention on both management and user sides, the embodiments of the present invention increase redundancy so as to prevent loss of data in the event of a failure on a data heavy side. For example, in conventional systems, the approach is to minimize changes made on the memory chunks user side, trying to solve the problems only on a storage management side. As a result, conventional systems only store copy information on a management side, which in the event of a management side system failure, leads to a series of manual recovery procedures on the client/customer systems, causing data unavailability, and in some cases data loss.

The host devices 150 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 150 and the storage system 105 may be implemented on respective distinct processing platforms, although numerous other arrangements are possible. For example, in some embodiments at least portions of the host devices 150 and the storage system 105 are implemented on the same processing platform. The storage system 105 can therefore be implemented at least in part within at least one processing platform that implements at least a portion of the host devices 150.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 150 and storage system 105 to reside in different data centers. Numerous other distributed implementations of one or both of the host devices 150 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 11 and 12.

It is to be appreciated that these and other features of illustrative embodiments are presented by way of example only, and should not be construed as limiting in any way.

Accordingly, different numbers, types and arrangements of system components such as host devices 150, network 104, storage system 105, storage devices 106, storage controller 108, memory chunks 110 and servers 130 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, in other embodiments, one or more portions of the functionality for maintaining storage of memory portion copies in multiple locations and enabling communication about storage status between storage controller and user/client components can be distributed over one or more storage systems and one or more associated host devices, each comprising one or more processing devices.

The operation of the information processing system 100 will now be described in further detail with reference to the flow diagram of the illustrative embodiment of FIG. 9. The process 900 as shown includes steps 901 through 909, and is suitable for use in system 100 but is more generally applicable to other types of information processing systems comprising a storage system configured to maintain storage of memory portion copies in multiple locations and enable communication about storage status between storage controller and user/client components. The steps are illustratively performed at least in part under the control of the storage controller 108 of system 100 using location control logic 112, the copy validator 114, communication component 116 and repository 118, as well as under the control of the host device 150 of system 100 using process control logic 151, the copy validator 153, copy control component 155, communication component 157 and repository 159.

In step 901, a plurality of servers 130 are monitored for a failure event. The plurality of servers 130 store a plurality of copies of a plurality of memory portions. The plurality of memory portions are referred to herein as memory chunks 110, and each memory portion comprises at least a part of a physical storage space of one or more of the storage devices 106.

In step 903, the process further includes marking as invalid at least one copy of a memory portion (e.g., a memory chunk copy) of the plurality of memory portions on a failed server of the plurality of servers. In step 905, at least one location on an operational server 130 for storing a new version of the at least one copy is searched for and identified.

A storage controller 108 comprises a repository 118 storing information associated with the memory portion corresponding to the at least one copy. The repository 118 is updated regarding progress of the search for and identification of the at least one location on the operational server for storing the new version of the at least one copy, and is updated regarding the invalidity of the at least one copy.

The information stored in the repository 118 comprises an identification entry for the memory portion, and a value indicating a number of times copies of the memory portion have been generated. The information stored in the repository also comprises a plurality of locations on one or more of the plurality of servers for storing the new version of the at least one copy, wherein the plurality of locations comprises the identified at least one location.

In step 907, the invalidity of the at least one copy and the identified at least one location is communicated to a client device (e.g., host device 150) using the memory portion. The information stored in the repository 118 also comprises a value indicating a number of failed communication attempts between the storage controller 108 and the client device 150. When communicating the invalidity of the at least one copy and the identified at least one location to the client device 150, the storage controller 108 also communicates the other information stored in the repository 118 to the client device 150. The storage controller 108 also transmits a request to the client device 150 to suspend all processes which will modify data stored in the memory portion corresponding to the at least one copy.

The client device 150 is configured to generate the new version of the at least one copy for storage on the operational server. Prior to generation of the new version, the client device 150 receives from the storage controller 108 a plurality of locations on one or more of the plurality of servers 130 for storing the new version of the at least one copy in addition to the identified at least one location, and eliminates one or more of the plurality of locations corresponding to one or more inaccessible servers. The client device 150 further eliminates one or more of the plurality of locations associated with an incorrect generation value in the memory portion indicating a number of times copies of the memory portion have been generated. The generation value is determined to be incorrect when the generation value is less than a last known generation value received from the storage controller 108, and/or when the generation value is greater than a sum of a last known generation value received from the storage controller 108 and a number of failed communication attempts between the storage controller 108 and the client device 150.

In step 909, the storage controller 108 receives a notification from the client device 150 regarding whether the new version of the at least one copy was generated and stored on the operational server. The notification includes an updated value indicating a number of times copies of the memory portion have been relocated.

Figure 9:
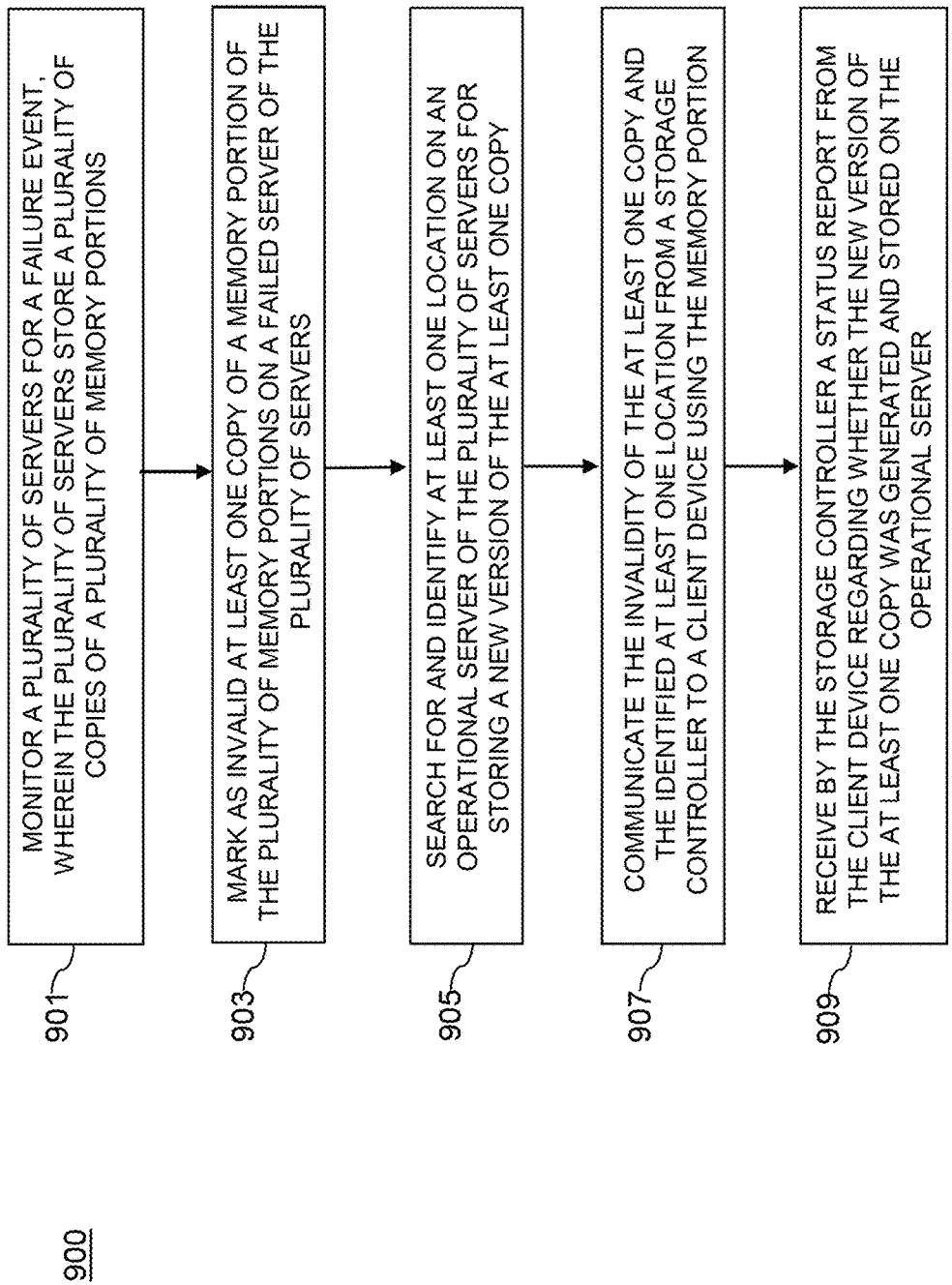
FIG. 9 is a flow diagram of a process for maintaining storage of memory portion copies in multiple locations and enabling communication about storage status between storage controller and user/client components in an illustrative embodiment.

The particular processing operations and other system functionality described in conjunction with the flow diagram of FIG. 9 are presented by way of illustrative example only, and should not be construed as limiting the scope of the disclosure in any way. Alternative embodiments can use other types of processing operations for maintaining storage of memory portion copies in multiple locations and enabling communication about storage status between storage controller and user/client components. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement storage of memory portion copies in multiple locations and enable communication about storage status between storage controller and user/client components within a given information processing system.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 9 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO® storage array or other type of content addressable storage system suitably modified to maintain storage of memory portion copies in multiple locations and enable communication about storage status between storage controller and user/client components as disclosed herein.

An illustrative embodiment of such a content addressable storage system will now be described with reference to FIG. 10. In this embodiment, a content addressable storage system 1005 comprises a plurality of storage devices 1006 and an associated storage controller 1008, as well as servers 1030-1, 1030-2, . . . , 1030-P. The content addressable storage system 1005 may be viewed as a particular implementation of the storage system 105, and accordingly is assumed to be coupled to host devices 150 of computer system 101 via network 104 within information processing system 100.

The storage controller 1008 in the present embodiment is configured to maintain storage of memory portion copies in multiple locations and enable communication about storage status between storage controller and user/client components as previously described in conjunction with FIGS. 1 through 9.

The storage controller 1008 illustratively includes distributed implementations of location control logic 1012, copy validator 1014, communication component 106 and repository 1018, which are configured to operate in a manner similar to that described above for respective corresponding modules 112, 114, 116 and 118 of storage controller 108. The distributed implementations of location control logic 1012, copy validator 1014, communication component 1016 and repository 1018 illustratively each comprise multiple instances of that particular module deployed on respective ones of a plurality of distributed processing modules of the storage controller 1008.

The content addressable storage system 1005 illustratively includes distributed implementations of servers 1030, which are configured to operate in a manner similar to that described above for servers 130 of the storage system 105. The distributed implementations of servers 1030 in the present embodiment more particularly comprise different sets of servers 1030 implemented on each of the storage nodes 1015.

Figure 10:
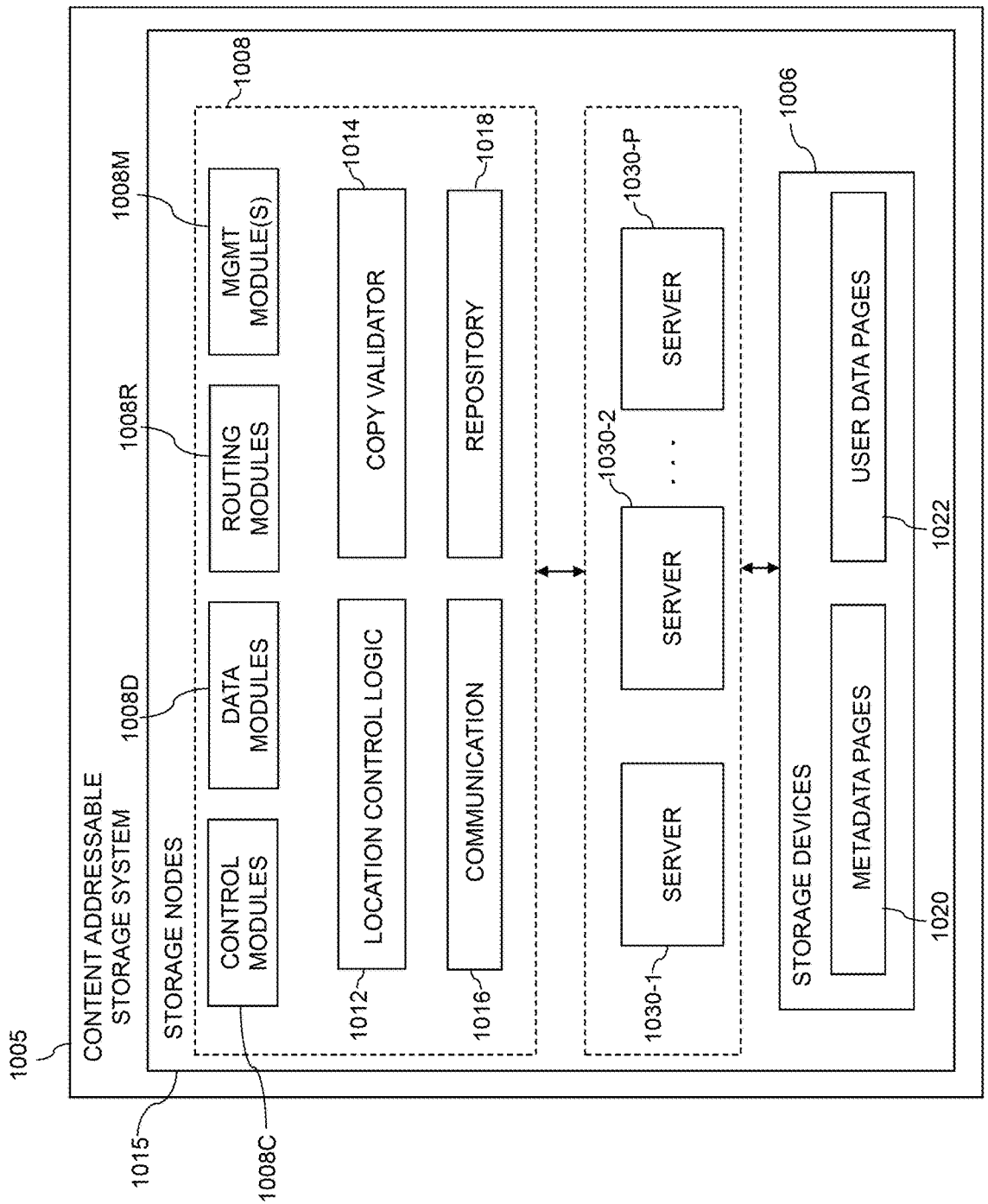
FIG. 10 shows an example of a content addressable storage system having a distributed storage controller for maintaining storage of memory portion copies in multiple locations and enabling communication about storage status between storage controller and user components in an illustrative embodiment.

The content addressable storage system 1005 in the FIG. 10 embodiment is implemented as at least a portion of a clustered storage system and includes a plurality of storage nodes 1015 each comprising a corresponding subset of the storage devices 1006. Other clustered storage system arrangements comprising multiple storage nodes can be used in other embodiments. A given clustered storage system may include not only storage nodes 1015 but also additional storage nodes coupled to network 104. Alternatively, such additional storage nodes may be part of another clustered storage system of the system 100. Each of the storage nodes 1015 of the storage system 1005 is assumed to be implemented using at least one processing device comprising a processor coupled to a memory.

The storage controller 1008 of the content addressable storage system 1005 is implemented in a distributed manner so as to comprise a plurality of distributed storage controller components implemented on respective ones of the storage nodes 1015. The storage controller 1008 is therefore an example of what is more generally referred to herein as a "distributed storage controller." In subsequent description herein, the storage controller 1008 may be more particularly referred to as a distributed storage controller.

Each of the storage nodes 1015 in this embodiment further comprises a set of processing modules configured to communicate over one or more networks with corresponding sets of processing modules on other ones of the storage nodes 1015. The sets of processing modules of the storage nodes 1015 collectively comprise at least a portion of the distributed storage controller 1008 of the content addressable storage system 1005.

The modules of the distributed storage controller 1008 in the present embodiment more particularly comprise different sets of processing modules implemented on each of the storage nodes 1015. The set of processing modules of each of the storage nodes 1015 comprises at least a control module 1008C, a data module 1008D and a routing module 1008R. The distributed storage controller 1008 further comprises one or more management ("MGMT") modules 1008M. For example, only a single one of the storage nodes 1015 may include a management module 1008M. It is also possible that management modules 1008M may be implemented on each of at least a subset of the storage nodes 1015.

Each of the storage nodes 1015 of the storage system 1005 therefore comprises a set of processing modules configured to communicate over one or more networks with corresponding sets of processing modules on other ones of the storage nodes. A given such set of processing modules implemented on a particular storage node illustratively includes at least one control module 1008C, at least one data module 1008D and at least one routing module 1008R, and possibly a management module 1008M. These sets of processing modules of the storage nodes collectively comprise at least a portion of the distributed storage controller 1008.

Communication links may be established between the various processing modules of the distributed storage controller 1008 using well-known communication protocols such as IP and Transmission Control Protocol (TCP). For example, respective sets of IP links used in data transfer and corresponding messaging could be associated with respective different ones of the routing modules 1008R.

Although shown as separate modules of the distributed storage controller 1008, the modules 1012, 1014, 1016 and 1018 in the present embodiment are assumed to be distributed at least in part over at least a subset of the modules 1008C, 1008D, 1008R and 1008M of the storage controller 1008, as was indicated previously. Accordingly, at least portions of the functionality of the modules 1012, 1014, 1016 and 1018 may be implemented in one or more of the other modules of the storage controller 1008. In alternative embodiments, one or more of the modules 1012, 1014, 1016 and 1018 may be implemented as respective stand-alone modules of the storage controller 1008.

The storage devices 1006 are configured to store metadata pages 1020 and user data pages 1022, and may also store additional information not explicitly shown such as checkpoints and write journals. The metadata pages 1020 and the user data pages 1022 are illustratively stored in respective designated metadata and user data areas of the storage devices 1006. Accordingly, metadata pages 1020 and user data pages 1022 may be viewed as corresponding to respective designated metadata and user data areas of the storage devices 1006.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 1020 and the user data pages 1022.

The user data pages 1022 are part of a plurality of logical units (LUNs) configured to store files, blocks, objects or other arrangements of data, each also generally referred to herein as a "data item," on behalf of users associated with host devices 150. Each such LUN may comprise particular ones of the above-noted pages of the user data area. The user data stored in the user data pages 1022 can include any type of user data that may be utilized in the system 100. The term "user data" herein is therefore also intended to be broadly construed.

A given set of memory chunks subject to copying and relocation utilizing modules 1012, 1014, 1016 and 1018 illustratively comprises a set of LUNs, each including multiple ones of the user data pages 1022 stored in storage devices 1006.

The content addressable storage system 1005 in the embodiment of FIG. 10 is configured to generate hash metadata providing a mapping between content-based digests of respective ones of the user data pages 1022 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 1022. The hash metadata generated by the content addressable storage system 1005 is illustratively stored as metadata pages 1020 in the metadata area. The generation and storage of the hash metadata is assumed to be performed under the control of the storage controller 1008.

Each of the metadata pages 1020 characterizes a plurality of the user data pages 1022. For example, a given set of user data pages representing a portion of the user data pages 1022 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 1006.

Each of the metadata pages 1020 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 1020 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 1005 is illustratively distributed among the control modules 1008C.

The functionality provided by modules 1012, 1014, 1016 and 1018 in this embodiment is assumed to be distributed across multiple distributed processing modules, including at least a subset of the processing modules 1008C, 1008D, 1008R and 1008M of the distributed storage controller 1008.

For example, the management module 1008M of the storage controller 1008 may include location control logic that engages corresponding location control logic instances in all of the control modules 1008C and routing modules 1008R in order to implement at least portions of a location control process.

In some embodiments, the content addressable storage system 1005 comprises an XtremIO® storage array suitably modified to incorporate techniques for maintaining storage of memory portion copies in multiple locations and enabling communication about storage status between storage controller and user/client components as disclosed herein.

In arrangements of this type, the control modules 1008C, data modules 1008D and routing modules 1008R of the distributed storage controller 1008 illustratively comprise respective C-modules, D-modules and R-modules of the XtremIO™ storage array. The one or more management modules 1008M of the distributed storage controller 1008 in such arrangements illustratively comprise a system-wide management module ("SYM module") of the XtremIO™ storage array, although other types and arrangements of system-wide management modules can be used in other embodiments. Accordingly, relocation and communication functionality in some embodiments is implemented under the control of at least one system-wide management module of the distributed storage controller 1008, utilizing the C-modules, D-modules and R-modules of the XtremIO™ storage array.

A given such system-wide management module can be configured to support one or more sets of additional application programming interface (API) commands relating to maintaining storage of memory portion copies in multiple locations and enabling communication about storage status between storage controller and user/client components as disclosed herein.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 1008C such that control of the slices within the storage controller 1008 of the storage system 1005 is substantially evenly distributed over the control modules 1008C of the storage controller 1008.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 1005 each illustratively comprise one or more IO operations directing that at least one data item of the storage system 1005 be written to in a particular manner. A given write request is illustratively received in the storage system 1005 from a host device, illustratively one of the host devices 150. In some embodiments, a write request is received in the distributed storage controller 1008 of the storage system 1005, and directed from one processing module to another processing module of the distributed storage controller 1008. For example, a received write request may be directed from a routing module 1008R of the distributed storage controller 1008 to a particular control module 1008C of the distributed storage controller 1008. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO® context, the C-modules, D-modules and R-modules of the storage nodes 1015 communicate with one another over a high-speed internal network such as an InfiniBand network. The C-modules, D-modules and R-modules coordinate with one another to accomplish various IO processing tasks.

The write requests from the host devices identify particular data pages to be written in the storage system 1005 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 1005 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 1005.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 1006. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 1005 correspond to respective physical blocks of a physical layer of the storage system 1005. The user data pages of the logical layer are organized by LBA and have reference via respective content-based signatures to particular physical blocks of the physical layer.

Each of the physical blocks has an associated reference count that is maintained within the storage system 1005. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 1008C, 1008D, 1008R and 1008M as shown in the FIG. 10 embodiment is presented by way of example only. Numerous alternative arrangements of processing modules of a distributed storage controller may be used to implement relocation and communication functionality in a clustered storage system in other embodiments.

Additional examples of content addressable storage functionality implemented in some embodiments by control modules 1008C, data modules 1008D, routing modules 1008R and management module(s) 1008M of distributed storage controller 1008 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of an information processing system maintaining storage of memory portion copies in multiple locations and enabling communication about storage status between storage controller and user/client components as disclosed herein can provide a number of significant advantages relative to conventional arrangements.

The present embodiment and other embodiments described herein permit symmetric information exchange and functionality between user (e.g., host or client) and storage system control/management sides, which allows for valid memory chunk copies, including the most up-to-date versions of the memory chunk copies, to be readily accessed and relocated in the event of system or component failures.

Illustrative embodiments overcome the difficulties that would otherwise be associated with relocating and accessing data in response to system or component failures. For example, conventional approaches fail to implement relocation logic on both user/client and management sides, and fail to provide techniques for communication between user/client and management sides regarding crucial memory chunk information related to memory chunk copy versions, the relocation process, whether communication attempts between each side are successful, and status and validity of memory chunk copies and storage locations. Embodiments of the present invention advantageously exchange repository and status information between user/client and storage management sides during multiple phases of a relocation process.

As compared with conventional systems, which implement most of the logic involved in memory chunk relocation on a memory resource management side, the embodiments of the present invention establish symmetric communication and functionality between both management and user sides regarding maintenance, relocation and storage of valid memory chunk copies, which avoids data loss in the event of a failure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for maintaining storage of memory portion copies in multiple locations and enabling communication about storage status between storage controller and user/client components will now be described in greater detail with reference to FIGS. 11 and 12. Although described in the context of system 100, these platforms may also be used to implement at least portions of other information processing systems in other embodiments.

Figure 11:
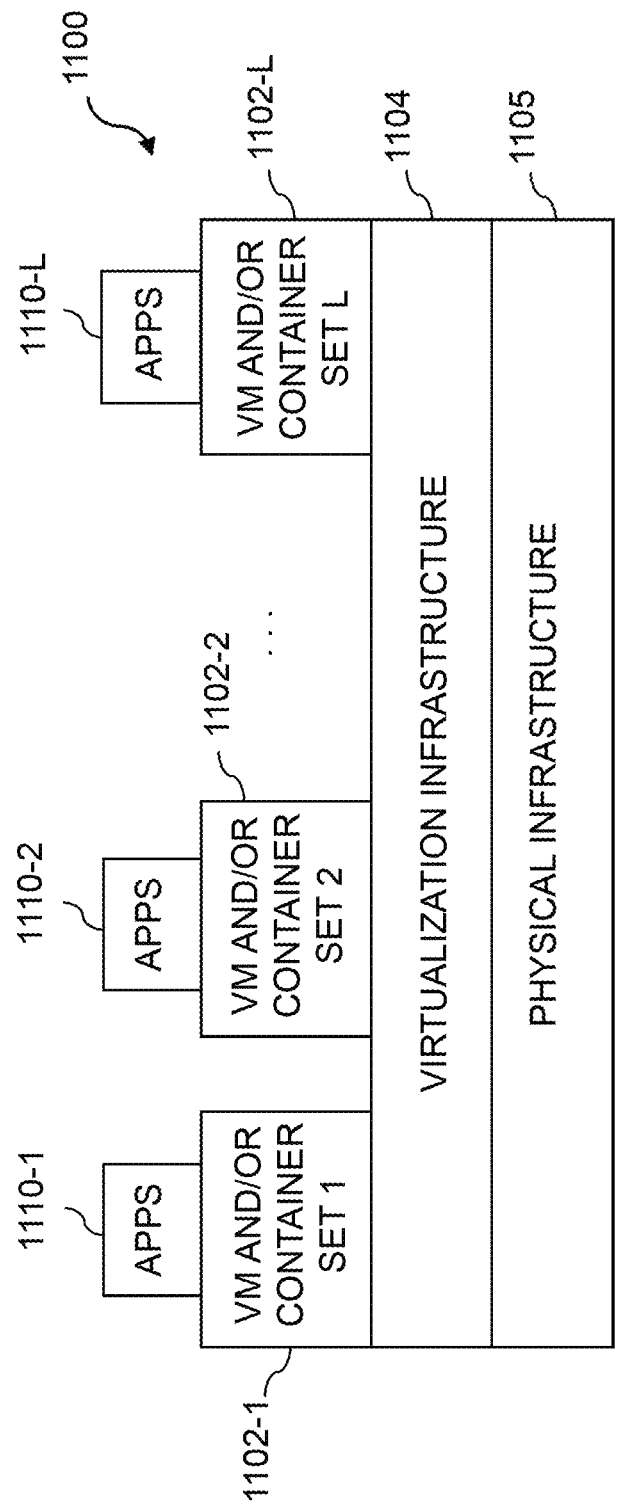
FIGS. 11 and 12 show examples of processing platforms that may be utilized to implement at least a portion of an information processing system in illustrative embodiments.
Figure 12:
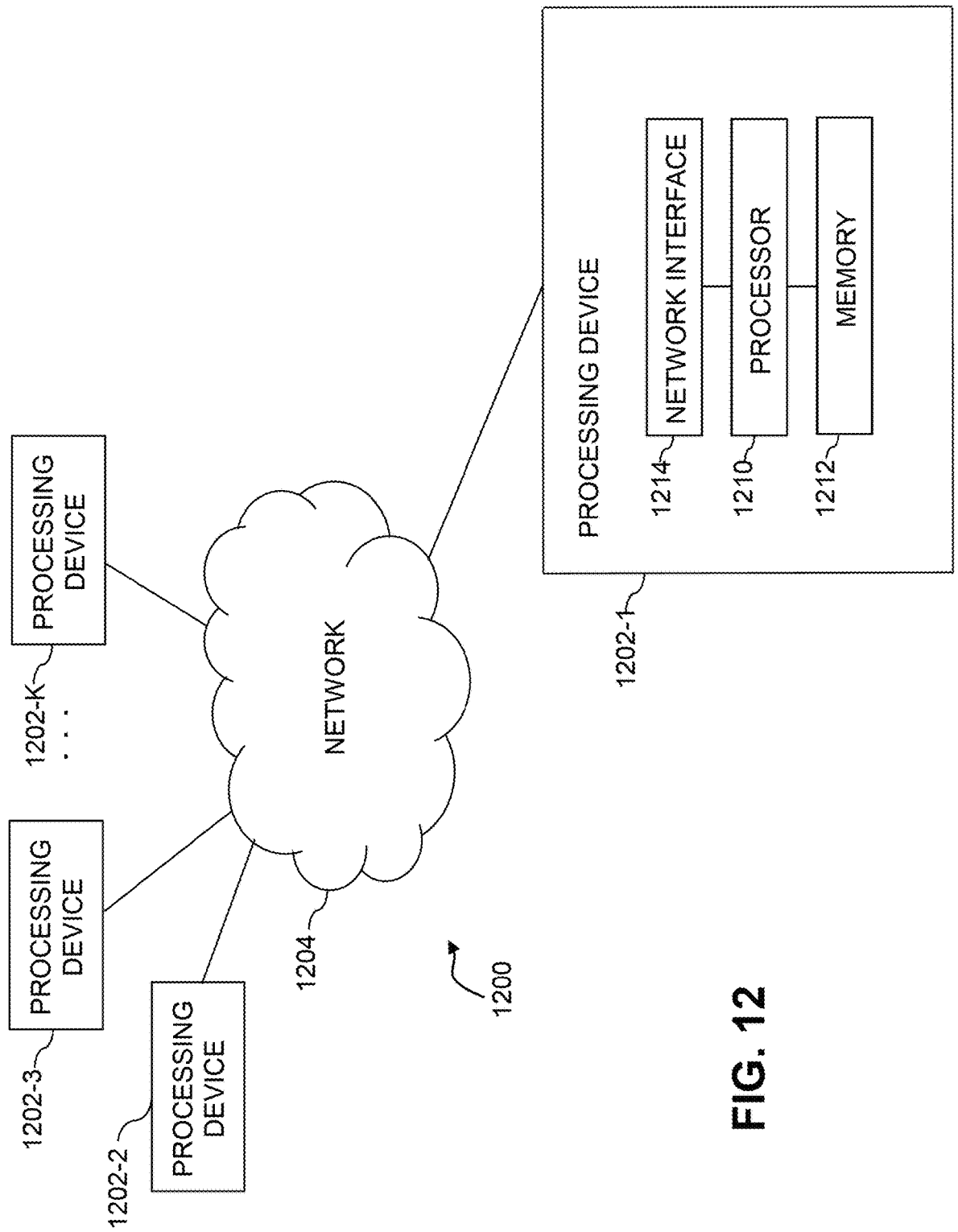

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can illustratively provide at least portions of relocation and communication functionality of the type described above. For example, one or more of the VMs can be configured to implement at least a portion of a storage controller and its associated location control logic and other modules for providing relocation and communication functionality in the system 100.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can also illustratively provide at least portions of relocation and communication functionality of the type described above. For example, a container host device supporting multiple containers of one or more container sets can be configured to implement at least a portion of a storage controller and its associated location control logic and other modules for providing functionality for maintaining storage of memory portion copies in multiple locations and enabling communication about storage status between storage controller and user/client components in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a graphics processing unit (GPU), or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the relocation and communication functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, location control logic, copy validators and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a storage system comprising a storage controller and a plurality of storage devices comprising a plurality of memory portions;
    the storage controller being configured:
    to monitor a plurality of servers for a failure event, wherein the plurality of servers store a plurality of copies of the plurality of memory portions;
    to mark as invalid at least one copy of a memory portion of the plurality of memory portions on a failed server of the plurality of servers;
    to search for and identify at least one location on an operational server of the plurality of servers for storing a new version of the at least one copy;
    to communicate the invalidity of the at least one copy and the identified at least one location to a client device using the memory portion;
    wherein the new version of the at least one copy is associated with a generation value indicating a number of times copies of the memory portion have been generated;
    wherein the client device is configured:
        to determine whether the new version of the at least one copy can be validly generated for storage on the operational server based at least in part on whether the generation value satisfies a specified relationship to a last known generation value received from the storage controller; and
        to generate the new version of the at least one copy for storage on the operational server responsive to an affirmative determination; and
        to receive a notification from the client device regarding whether the new version of the at least one copy was generated and stored on the operational server;
    wherein the storage controller comprises at least one processing device comprising a processor coupled to a memory.

2. The apparatus of claim 1 wherein the plurality of memory portions each comprise at least a part of a physical storage space of one or more of the storage devices.

3. The apparatus of claim 1 wherein the storage controller comprises a repository storing information associated with the memory portion corresponding to the at least one copy.

4. The apparatus of claim 3 wherein the storage controller is further configured to update the repository regarding progress of the search for and identification of the at least one location on the operational server for storing the new version of the at least one copy.

5. The apparatus of claim 4 wherein the storage controller is further configured to update the repository regarding the invalidity of the at least one copy.

6. The apparatus of claim 3 wherein the information stored in the repository comprises an identification entry for the memory portion.

7. The apparatus of claim 3 wherein the information stored in the repository comprises the generation value indicating the number of times copies of the memory portion have been generated.

8. The apparatus of claim 3 wherein the information stored in the repository comprises a plurality of locations on one or more of the plurality of servers for storing the new version of the at least one copy, wherein the plurality of locations comprises the identified at least one location.

9. The apparatus of claim 3 wherein the information stored in the repository comprises a value indicating a number of failed communication attempts between the storage controller and the client device.

10. The apparatus of claim 3 wherein in communicating the invalidity of the at least one copy and the identified at least one location to the client device, the storage controller is configured to communicate the information stored in the repository to the client device.

11. The apparatus of claim 1 wherein the storage controller is further configured to transmit a request to the client device to suspend all processes which will modify data stored in the memory portion corresponding to the at least one copy.

12. The apparatus of claim 1 wherein:
    the storage controller is further configured to communicate to the client device a plurality of locations on one or more of the plurality of servers for storing the new version of the at least one copy in addition to the identified at least one location; and
    the client device is further configured to eliminate one or more of the plurality of locations corresponding to one or more inaccessible servers.

13. The apparatus of claim 1 wherein:
    the storage controller is further configured to communicate to the client device a plurality of locations on one or more of the plurality of servers for storing the new version of the at least one copy in addition to the identified at least one location; and
    the client device is further configured to eliminate one or more of the plurality of locations associated with a given generation value in the memory portion indicating the number of times copies of the memory portion have been generated that fails to satisfy the specified relationship to a last known generation value received from the storage controller.

14. The apparatus of claim 13 wherein the client device is further configured to determine that the given generation value fails to satisfy the specified relationship when the given generation value is less than the last known generation value received from the storage controller.

15. The apparatus of claim 13 wherein the client device is further configured to determine that the given generation value fails to satisfy the specified relationship when the given generation value is greater than a sum of the last known generation value received from the storage controller and a number of failed communication attempts between the storage controller and the client device.

16. The apparatus of claim 1 wherein the notification includes an updated generation value indicating the number of times copies of the memory portion have been generated.

17. A method comprising:
monitoring a plurality of servers for a failure event, wherein the plurality of servers store a plurality of copies of a plurality of memory portions;
marking as invalid at least one copy of a memory portion of the plurality of memory portions on a failed server of the plurality of servers;
searching for and identifying at least one location on an operational server of the plurality of servers for storing a new version of the at least one copy;
communicating the invalidity of the at least one copy and the identified at least one location from a storage controller to a client device using the memory portion;
wherein the new version of the at least one copy is associated with a generation value indicating a number of times copies of the memory portion have been generated;
wherein the client device is configured:
to determine whether the new version of the at least one copy can be validly generated for storage on the operational server based at least in part on whether the generation value satisfies a specified relationship to a last known generation value received from the storage controller; and
to generate the new version of the at least one copy for storage on the operational server responsive to an affirmative determination; and
receiving by the storage controller a notification from the client device regarding whether the new version of the at least one copy was generated and stored on the operational server;
wherein the method is implemented by at least one processing device comprising a processor coupled to a memory.

18. The method of claim 17 wherein the notification includes an updated generation value indicating the number of times copies of the memory portion have been generated.

19. A computer program product comprising a non-transitory processor-readable storage medium having stored therein program code of one or more software programs, wherein the program code when executed by at least one processing device causes said at least one processing device:
to monitor a plurality of servers for a failure event, wherein the plurality of servers store a plurality of copies of a plurality of memory portions;
to mark as invalid at least one copy of a memory portion of the plurality of memory portions on a failed server of the plurality of servers;
to search for and identify at least one location on an operational server of the plurality of servers for storing a new version of the at least one copy;
to communicate the invalidity of the at least one copy and the identified at least one location from a storage controller to a client device using the memory portion;
wherein the new version of the at least one copy is associated with a generation value indicating a number of times copies of the memory portion have been generated;
wherein the client device is configured:
to determine whether the new version of the at least one copy can be validly generated for storage on the operational server based at least in part on whether the generation value satisfies a specified relationship to a last known generation value received from the storage controller; and
to generate the new version of the at least one copy for storage on the operational server responsive to an affirmative determination; and
to receive by the storage controller a notification from the client device regarding whether the new version of the at least one copy was generated and stored on the operational server.

20. The computer program product of claim 19 wherein the notification includes an updated generation value indicating the number of times copies of the memory portion have been generated.

* * * * *